UNITED STATES PATENT OFFICE.

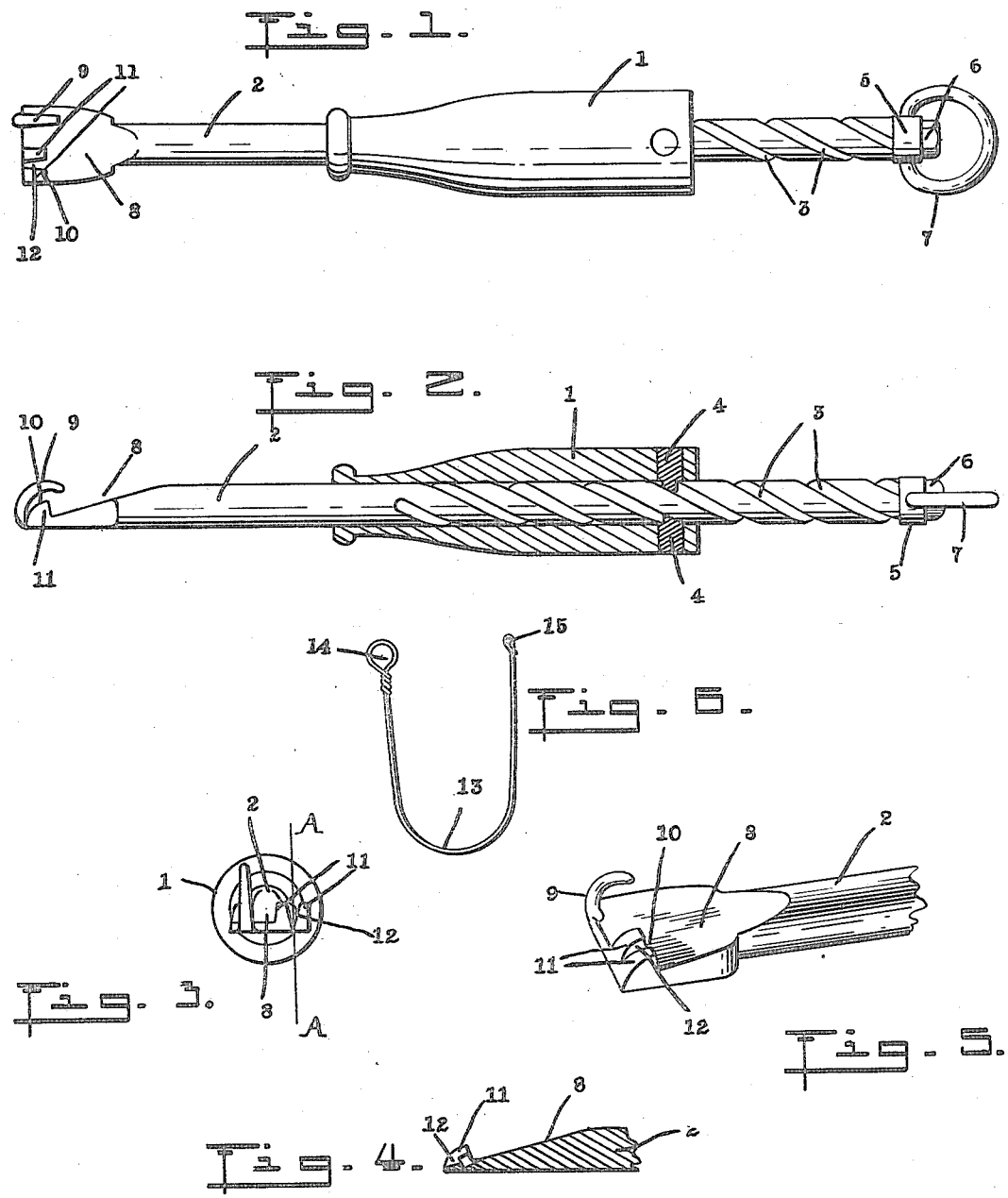

FREDERICK W. FEGELY, OF ALLENTOWN, PENNSYLVANIA, ASSIGNOR TO MODERN BAG COMPANY, A CORPORATION OF NEW JERSEY.

WIRE-TIE TWISTER.

1,136,220.   Specification of Letters Patent.   Patented Apr. 20, 1915.

Application filed August 3, 1914. Serial No. 854,636.

*To all whom it may concern:*

Be it known that I, FREDERICK W. FEGELY, a citizen of the United States, and a resident of Allentown, in the county of Lehigh and State of Pennsylvania, have invented certain new and useful Improvements in Wire-Tie Twisters, of which the following is a specification.

This invention relates to that class of implements which are employed for twisting pieces of wire around the necks of bags, such as cement bags after they have been filled, to close the same, an operation which must be performed with great rapidity by unskilled labor and yet close the bags effectually.

The objects of the invention are to provide a tool by which a wire bag tie can be quickly and effectually applied to close the bag; to secure a tool which can be used with great rapidity, even by an unskilled laborer; to prevent inadvertent escape of the wire while it is being applied, and yet enable the wire to be quickly and easily caught by the tool; to thus save time, labor and expense, and to secure other advantages and results as may be brought out in the following description.

Referring to the accompanying drawings in which like numerals of reference indicate the same parts throughout the several views, Figure 1 is a plan view of a tool embodying my invention; Fig. 2 is a side view of the same, showing the handle in section; Fig. 3 is an end view looking at the left-hand end of Fig. 2; Fig. 4 is a sectional view of the wire-engaging end taken on line A—A of Fig. 3; Fig. 5 is a perspective view of said wire-engaging end, and Fig. 6 is a view of the wire tie ready to be twisted.

In the specific embodiment of the invention illustrated in said drawings, 1 indicates a handle bored longitudinally and axially for the reception of an elongated shank 2 having therein a double spiral groove 3.

Extending radially inward from the handle is a pair of opposite fingers 4, 4 the inner ends of which engage within the spiral grooves so as to cause the shank to rotate as the handle is reciprocated.

A collar 5 is rotatably secured at one end of the shank 2 as by a nut 6, and a ring 7 is swiveled to said collar whereby a cord or chain attached to said ring and the belt of the operator will not become snarled or entangled as the handle is reciprocated, and yet the handle can be moved away from the operator to the forward end of the shank.

The shank 2 near its forward end is flattened transversely as at 8, and at its extremity is provided with a separated pair of tie-engaging members 9 and 10. One of these members, as 9, is a long hook which extends from the forward end of the flattened portion upwardly and rearwardly over the same. The other member comprises a pair of short claws, 11, 11 between which is a tapered slot 12, the smaller end of which is at the bottom of the claws and adapted to receive within itself the end of a wire and grip the same.

The tie which I have found best adapted to use with my tool comprises a wire 13 having at one end a loop 14 which will readily be caught by the hook 9, the other end of the wire being headed in any suitable manner, as for instance by returning the wire upon itself as shown at 15.

In operation an operator first draws the handle 1 along the shank 2 toward its forward or tie-engaging end. Then he catches the loop 14 of the wire 13 upon the hook 9, bends the wire around the neck of the bag and engages the head 15 of the wire in the slot 12 between the claws 11, 11; he then draws the handle longitudinally of the shank, which causes the shank to rotate, revolving the ends of the wire and twisting the same so as to cause the middle portion of the wire to form a closed loop securely tying the bag. It is a feature of the present invention to provide tie-engaging members which are different, so that the operator who has to work with great rapidity can catch the ends of the tie correctly on the tool without any especial attention or thought. The long hook 9 of my tool sticks up prominently and is the only place the eye or loop 14 of the tie can be caught; in other words, there is only one place to catch said eye or loop and the operator does not have to exercise any selection. Furthermore, the hook 9 securely holds the wire so that it will not become detached therefrom while being carried around the neck of the bag. The other end is not likely to become detached because it is secured just before the tool is pulled to make the twist, and it is easily and readily inserted between the low claws 11, 11.

Inasmuch as an operator has to tie thousands of bags in a day, and it must be done with great rapidity, it is very important that the operation should be made as nearly mechanical as possible and this I have accomplished by my invention. Obviously, in a tool having both of the engaging members hooks of equal length the operator would have to exercise some care to put the second end upon the other hook from which he put the first end, or to always put the first end upon the same hook. There is similar objection to having both the tie-engaging members slots between claws, and furthermore the tie is liable to escape from the first slot while the operator is bending the wire around the neck of the bag. By my invention the long hook 9 projects beyond the short claws so that the eye or loop of the tie can be hooked mechanically thereon without any possibility of error or escape while the wire is carried around the neck of the bag and its other end pressed into the slot between the claws 11, 11. The operator has to give little care or attention to the operation and can therefore work much faster and at the same time do better work.

Having thus described the invention, what I claim is.

In a device of the character described, a handle, a shank within said handle adapted to be rotated by movement of the handle longitudinally, said shank provided at its end with a pair of tie-engaging members comprising a hook and a pair of claws respectively, said claws being separated by a slot adapted to receive and grip the head end of a wire tie, and the hook being adapted to receive the loop end of a wire tie.

FREDERICK W. FEGELY.

Witnesses:
MIRIAM CLEWELL,
HENRY W. MOHR.